United States Patent Office 3,486,854
Patented Dec. 30, 1969

3,486,854
METHOD FOR THE IDENTIFICATION OF
PARACRIL RUBBER
Panagiotis L. Panagoulias, Highland Park, Mich., assignor to the United States of America as represented by the Secretary of the Army
No Drawing. Filed Mar. 2, 1967, Ser. No. 621,103
Int. Cl. G01n 33/44
U.S. Cl. 23—230                                    10 Claims

ABSTRACT OF THE DISCLOSURE

A method for the qualitative identification of butadiene-vinyl pyridine copolymers comprising the steps of: reacting a test sample with an inorganic acid; depolymerizing said reacted test sample with sodium hydroxide; and treating said reacted and depolymerized test sample with 1-chloro-2,4-dinitrobenzene and aniline; said method yielding a chromophoric polymethine when a butadiene-vinylpyridine copolymer is present in said test sample.

---

The invention described herein may be manufactured and used by or for the Government for governmental purposes without the payment to me of any royalty thereon or therefor.

The present invention relates to a method for the qualitative identification of paracril or butadiene and vinyl pyridine copolymers under all conditions of occurrence. More particularly, the invention provides a method of fissuring the aforementioned elastomer molecule to produce a reaction product whose color provides a quick, simple, and positive method for the qualitative identification of paracril polymers in compounds or mixtures with other elastomers.

The elastomer identification methods of the prior art have almost universally begun with a decomposing pyrolysis of the sample. The vapors formed by this decomposition then being tested for the presence of the various decomposition products of the particular polymer. The present invention eliminates the necessity for such pyrolysis and provides a strictly chemical method for the identification of the paracril elastomers present as compounds or mixtures by using a specific procedure which eliminates the interference of other polymers or mixtures of polymers, whose interference in the pyrolytic decomposition techniques often causes such tests to yield inconclusive or ambiguous results.

It is therefore an object of the present invention to provide a specific, precise, and accurate method for the identification of paracril or butadiene-vinyl pyridine copolymers under all conditions of occurrence.

Another object of the present invention is the provision of an improved substitute for the pyrolytic techniques for the qualitative analysis of butadiene-vinyl pyridine copolymers present alone or as compounds or mixtures with other elastomer compounds.

The following description will make other objects and advantages of the present invention obvious to those skilled in the qualitative analytical arts.

According to the present invention, there is provided a non-pyrolytic method for the identification of paracril elastomers under all condition of occurrence.

More particularly, the invention provides a method for the identification of paracril polymers comprising the steps of eliminating, by chemical reaction with nitric acid, the double bond of the polymer chain; depolymerizing the molecule by treatment with a sodium hydroxide solution; and fissuring the pyridine ring with 1-chloro-2,4-dinitrobenzene and aniline to yield a red-brown polymethine solution whose occurrence indicates the presence of a paracril or butadiene-vinyl pyridine copolymer.

In accordance with the method of this invention a 2 g. portion of the sample to be tested is cut into small pieces and the same extracted with acetone according to ASTM Procedure D–297 for an 8–10 hour period. The sample is then dried at room temperature and transferred to a test tube containing 80 ml. of 2,2,4-trimethylpentane and this mixture refluxed for 2–3 hours. The 2,2,4-trimethylpentane is chosen as solvent due to its inertness toward elastomer compositions.

After refluxing, the sample solution is transferred to another tube containing 4 ml. of $HNO_3$ (1.425 sp. gr.). The mixture thus formed is shaken and then refluxed at 110° C. for 20 minutes. This solution is allowed to cool and is subsequently neutralized with a solution of NaOH in methylcellosolve (20 g. NaOH in 80 g. of methylcellosolve). Once neutralization is attained a 10 ml. excess of the NaOH solution is added. This mixture is refluxed for 30 minutes so as to cause depolymerization of the elastomer molecule.

This depolymerized sample solution is neutralized with a concentrated halide acid and rendered slightly acidic by addition of a slight excess of HCl or HBr.

Ten ml. of the sample solution is placed in a test tube with 0.1 g. 1-chloro-2,4-dinitrobenzene and one drop of aniline from a glass capillary 4/10 mm. of diameter. This mixture is shaken and then boiled for a few seconds. The appearance of a red-brown color indicates the presence of a butadiene-vinyl pyridine copolymer, a paracril rubber.

The chemistry of this technique is explained as follows: the $HNO_3$ is added so that it may react at the aliphatic double bonds of the elastomer molecule. The bonds of the pyridine ring are stable and impervious to attack by this acid. The pyridine ring is subsequently freed from the balance of the elastomer molecule by depolymerization treatment with the NaOH-methylcellosolve solution, and then fissured to a simple aliphatic compound by treatment with 1-chloro-2,4-dinitrobenzene and aniline. From this fissure the anilide of glutaconic aldehyde, a polymethine, is formed, said compound having a red-brown appearance which indicates the presence of the paracril polymer. The addition of HCl or HBr causes an increase in the red-brown color because the HCl or HBr reacts additively with the auxochrome amine-nitrogen causing a change of valence of the nitrogen which consequently produces an increase in color production.

The mechanisms of the fissure of the pyridine ring and the subsequent formation of the auxochrome are demonstrated below:

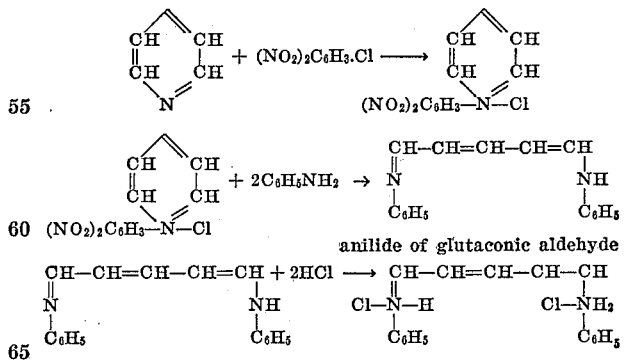

What is claimed is:
1. A method for the qualitative identification of polybutadiene-vinyl pyridine copolymers comprising the steps of:
   (a) reacting a test sample with nitric acid;
   (b) depolymerizing said test sample with sodium hydroxide; and

(c) reacting said depolymerized test sample with 1-chloro-2,4-dinitrobenzene and aniline to produce a chromophoric polymethine when said test sample contains a polybutadiene-vinyl pyridine copolymer.

2. A method in accordance with claim 1 wherein said test sample is dissolved in an inert solvent to form a test sample solution prior to reacting said test sample with said nitric acid.

3. A method in accordance with claim 2 wherein said solvent consists of 2,2,4-trimethylpentane.

4. A method in accordance with claim 2 wherein said test sample is extracted with acetone for an 8–10 hour period according to ASTM Procedure D–297 prior to being dissolved in said inert solvent.

5. A method in accordance with claim 2 wherein said test sample is extracted with acetone for an 8–10 hour period according to ASTM Procedure D–297 prior to reaction with said nitric acid.

6. A method in accordance with claim 2 wherein said test sample solution is refluxed for a two to three hour period subsequent to formation of said test sample solution and prior to reaction of said test sample with said nitric acid.

7. The method of claim 2 wherein said reaction of said test sample with said nitric acid is accomplished by refluxing said test sample solution and acid mixture at 110° C.

8. The method of claim 2 wherein said sodium hydroxide is added in the form of a 20 percent by weight solution in methylcellosolve.

9. The method of claim 2 wherein said depolymerization is accomplished through the addition of an excess of said sodium hydroxide in methylcellosolve solution so as to render the reaction mixture slightly basic.

10. The method of claim 2 wherein immediately prior to said reaction with 1-chloro-2,4-dinitrobenzene and aniline said test sample solution is acidified by the addition of an acid selected from the group consisting of hydrochloric acid and hydrobromic acid.

References Cited

Burchfield, H., Chem. Abstr. 40, $3292^2$, 1946.
Mano, E. B., Chem. Abstr. 57, 997f, 1962.
ASTM Standards on Rubber Products 1957, pp. 132, 133, TS1892A45.

MORRIS O. WOLK, Primary Examiner

R. M. REESE, Assistant Examiner